(12) United States Patent
Farley

(10) Patent No.: US 6,187,187 B1
(45) Date of Patent: Feb. 13, 2001

(54) MAGNETIC SHOWER FILTER ASSEMBLY

(76) Inventor: David K. Farley, 1827 Capital St., Corona, CA (US) 91720

( * ) Notice: Under 35 U.S.C. 154(b), the term of this patent shall be extended for 0 days.

(21) Appl. No.: 09/348,514

(22) Filed: Jul. 7, 1999

(51) Int. Cl.[7] ............................ B01D 35/06; B01D 35/02; C02F 1/48
(52) U.S. Cl. ............................ 210/223; 210/222; 210/251; 210/282; 210/287; 210/289; 210/446; 210/449; 210/503; 239/553.3
(58) Field of Search ..................................... 210/222, 223, 210/251, 282, 287, 289, 446, 449, 503; 239/553.3

(56) References Cited

U.S. PATENT DOCUMENTS

| | | |
|---|---|---|
| 5,094,742 * | 3/1992 | Shalhoob ............................ 210/222 |
| 5,152,464 | 10/1992 | Farley . |
| 5,288,401 * | 2/1994 | Rodriguez ............................ 210/222 |
| 5,300,224 | 4/1994 | Farley . |
| 5,503,742 | 4/1996 | Farley . |
| 5,628,900 * | 5/1997 | Naito ..................................... 210/223 |
| 5,914,043 | 6/1999 | Farley . |

* cited by examiner

Primary Examiner—David A. Reifsnyder
(74) Attorney, Agent, or Firm—James G. O'Neill

(57) ABSTRACT

A shower filter assembly, having a thin or low-profile design, including a recessed inlet, which leads into an internal chamber having a filter element mounted therein to deflect water flowing into the internal chamber substantially evenly through a filter media held within the filter element. Magnets are provided in the compact shower filter to act on the water flowing therethrough, so as to breakdown carbonates therein and prevent the formation of line and scale deposits.

20 Claims, 1 Drawing Sheet

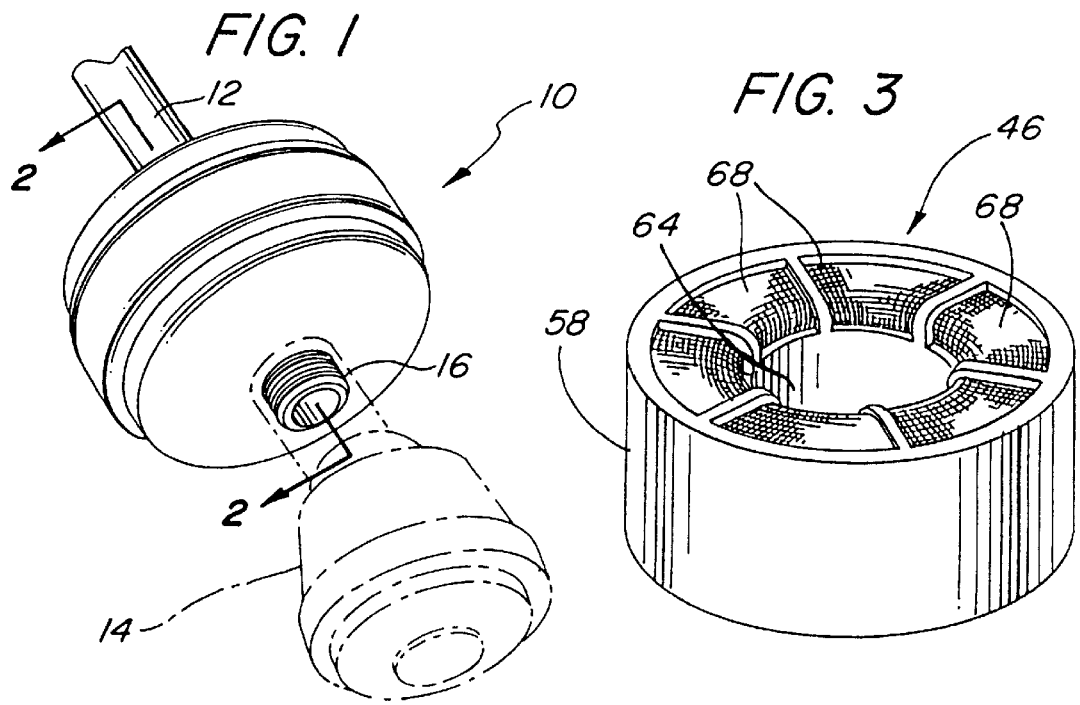
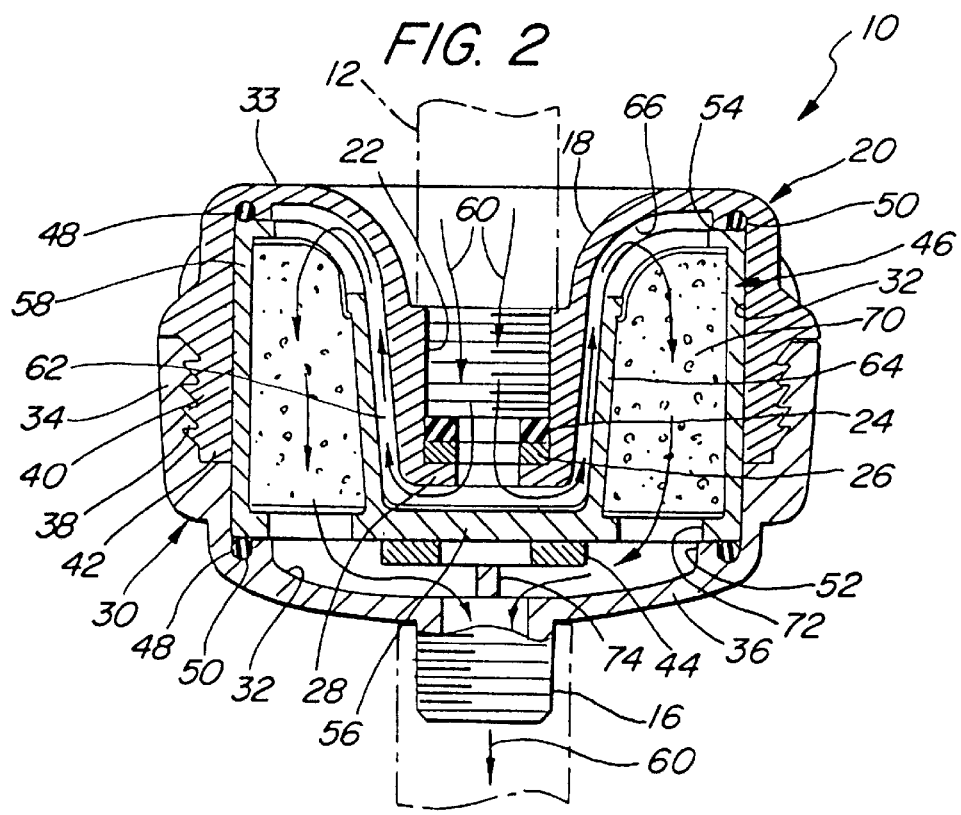

MAGNETIC SHOWER FILTER ASSEMBLY

BACKGROUND OF THE INVENTION

1. Field of the Invention

This invention relates generally to shower filters, and, more particularly, to an improved, compact shower filter, in which magnetic fields are applied to shower water flowing through the shower filter.

2. Description of Related Art

Shower filters for use in conjunction with showerheads are known. These filters are normally inserted into a water line, between the showerhead and the shower arm. However, because of the size of the shower filter added to the showerhead, the showerhead is moved or offset so that it extends further into a shower area where, in some cases, it interferes with a person taking a shower. Because of problems with the size and some installations of known shower filters, as well as the high cost of manufacturing, there exists the need in the art for a less-cumbersome, easy-to-install, low-cost, compact shower filter device, which device also applies magnetic fields to shower water to improve the performance of the device, and to minimize or prevent scaling.

Known shower filter assemblies are set forth in U.S. Pat. No. 5,503,742 to Farley, U.S. Pat. No. 5,300,224 to Farley, and U.S. Pat. No. 5,152,464 to Farley. While the foregoing prior art devices provide improved filtration of hot water passing through them, they do not contain means for applying magnetic fields to shower water, and are different in construction and operation from the shower filter of the present invention.

SUMMARY OF THE INVENTION

Accordingly, it is a general object of the present invention to provide an improved shower filter assembly. It is a particular object of the present invention to provide an improved compact shower filter assembly. It is a still more particular object of the present invention to provide an improved compact shower filter assembly that takes up a minimum amount of space, while providing improved results. It is a further particular object of the present invention to provide an improved compact shower filter that applies magnetic fields to shower water passing therethrough, to reduce the effect of scaling created by carbonates in the shower water. And, it is yet another particular object of the present invention to provide an improved compact shower filter having ultra-high strength ring magnets therein to breakdown the bonds of carbonates in shower water.

In accordance with one aspect of the present invention, there is provided a shower filter assembly having a compact design because of the use of an internal filter assembly and a recessed inlet. The shower filter assembly includes an internal chamber containing a specifically sized and dimensioned filter element for filtering out chlorine and other unwanted materials in the shower water, and for directing the flow of shower water through the filter and filter housing. The shower filter assembly is made as thin as possible to take up a minimum amount of space, and is provided with means for applying magnetic fields to shower water to provide improved performance and minimize scaling.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, wherein like reference numerals are used throughout the several views, and, in which:

FIG. 1 is a perspective view of a preferred embodiment of the shower filter assembly of the present invention, attached at the end of a shower arm, with a showerhead shown in broken line, attached to an outlet of the filter assembly;

FIG. 2 is a cross sectional view taken along line 2—2 of FIG. 1, looking in the direction of the arrows; and FIG. 3 is a perspective view of a preferred embodiment of a removable filter element held within an interior chamber formed in the shower filter assembly.

DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide for an improved compact shower filter assembly, generally indicated by the numeral 10.

Turning now to the drawings, FIGS. 1 and 2 show the compact shower filter assembly 10 of the present invention, fixed to the end of a shower arm or water pipe 12. For purposes of illustration only, a showerhead 14 is shown in broken line, attached to an outlet 16 of the shower filter assembly 10. It will be readily apparent to those skilled in the art that the assembly 10 may be any desired shape and fixed to the end of the shower arm 12, or the like, in any conventional manner. The improved assembly 10 includes an inlet 18 that is preferably formed integrally in a top wall 33 of a top or upper hollow housing portion 20. The inlet 18 is recessed in an internally extending annular portion 22 having a threaded passage formed therein. The threads within the internally extending or recessed portion 22 may be secured to a threaded end of the shower arm 12. A sealing element 24 is held in the internally extending annular portion 22, between the threaded end of the shower arm 12, against a means for applying or producing magnetic fields 26, and a reduced diameter shoulder 28 formed at or adjacent an inner end of the recessed annular portion 22.

The assembly 10 may be any desired shape, but is preferably cylindrical, with mating top and bottom hollow housing portions 20 and 30. An internal chamber 32 is formed between the mating hollow housing portions 20, 30. Upper and lower portions 20 and 30 may be fabricated in any desired manner, using any acceptable material, such as by molding a plastic material.

The upper portion 20 of assembly 10 includes the top wall 33, which is preferably flat, and has the inlet 18 and the recessed annular portion 22 formed integrally therewith. If desired, to guide insertion of the assembly 10 into a pipe 12, the inlet 18 may have an enlarged opening formed in the top wall 33, leading to the recessed annular portion 22.

The bottom or lower hollow housing portion 30 includes an annular outer end 34 formed integrally with a bottom wall 36. The annular outer end 34 includes internal threads 38, which cooperate with external threads 40 formed on an annular end 42 formed integrally with the top wall 33 of upper hollow housing portion 20. The outlet 16 is also formed integrally with, and substantially in the center of the exterior surface of the bottom wall 36 of lower portion 30, and extends outwardly or away, from the bottom wall 36.

As shown in FIG. 2, if needed, a second means for applying a magnetic field 44 is held in the internal chamber 32, below a filter element 46, above the outlet 16. The means for applying magnetic fields 26, 44 to shower water flowing through the filter device 10 are preferably ultra-high strength magnets. For example, in one embodiment of the invention the magnets 26, 44 are formed as rare earth (neodymium) ring magnets of different size. That is, the ring magnet 26 held in the recessed annular portion 22 is smaller than the ring magnet 44 held below the filter element 46, adjacent the outlet 16. However, each of the ring magnets 26, 44 are preferably formed so as to have a field strength of approximately 3,000 Gauss.

The use of at least one of the ring magnets 26, 44 of the present invention reduces the effect of scaling created by calcium and magnesium carbonates (lime) in so-called "hard water". Additionally, if both of the magnets 26, 44 are used, they further help to reduce chlorine exposure from shower water and provide therapeutic benefits.

Water is often referred to as "Nature's solvent" and is one of the best solvents known to man. Water tends to cluster around non-water particles, forming complexes that produce the mineral content in water. Some of the most common minerals in water are the carbonates, such as calcium carbonate and magnesium carbonate, which are similar to limestone found in rock formations, such as in hills or mountains. The amount of carbonates present in water determines the "hardness" of the water.

Hard water used in showers evaporates leaving carbonates that become concentrated crystals which form lime and scale deposits on shower walls and in showerheads. These deposits are very difficult to remove, can clog the showerhead nozzles, and are unsightly. This build up of lime and scale deposits occurs slowly, but nonetheless is noticeable over time. Therefore, the prevention of such deposits saves energy, money and time spent in cleaning and maintaining shower areas.

Calcium and magnesium carbonates can be chemically removed by selective ion exchange. However, this process is relatively expensive and greatly increases the sodium content in the shower water so treated, thus crating a possible health risk.

The reduction or elimination of scaling from shower water containing carbonates can be achieved a number of other ways, including mechanical whirling, sonic disturbance, electric frequencies and magnetic disturbances. They all reduce the formation of hard lime scale to some extent. However, after extensive testing, it has been found that the use of magnetic fields as disclosed in the present invention are the most practical and efficient application for use in a shower filter.

This is because upon evaporation, the calcium and magnesium carbonates form a crystalline carbonate structure based on individual molecular bonding called liming or scaling. This liming or scaling is very hard and resilient to normal cleaning abrasives. When left unchecked, the carbonates accumulate increasing the scaling deposits. Magnetic fields disrupt the bonding of the carbonate molecules as they dehydrate, so that an imperfect structure is formed. That is, the crystals formed by carbonate molecules subjected to a magnetic field, are structurally weaker, forming softer scale deposits, or in many cases entirely preventing the formation of scale deposits. Furthermore, the use of multiple magnetic polar fields, such as with one or multiple ring magnets 26, 44, as disclosed in the present invention, increases the disruption of the crystalline structure, thereby providing enhanced results.

Although two magnets are not always required, by placing at least one magnet, such as the magnet 26 in the inlet 18, and, if needed, depending on the hardness of the water, the magnet 44 at the outlet 16 of the shower filter 10, shower water passes through the inside and then the outside polar fields of each of these ring magnets. This, in effect, doubles polar field exposure of hard shower water from each magnet. Therefore, with the shower filter 10 of the present invention, having two magnets therein, shower water is exposed to eight (8) polar fields from just two ring magnets. This design dramatically increases the benefits resulting from the magnetic field exposure.

The upper and lower halves or portions 20, 30 are mated or secured together by the internal and external threads 38, 40 formed on the mating annular end portions 34, 42. When held together, as best shown in FIG. 2, the top and bottom mating halves 20, 30 hold the filter element 46 in the internal chamber 32. Sealing elements 48, such as O-ring seals, are held in annular grooves 50 formed in annular supporting portions or walls 52 formed within each of the top and bottom halves 20, 30. The sealing elements 48 cooperate with flat ends or walls 54, 56 of an annular housing portion 58 formed in the filter element 46, to seal the filter element in the internal chamber 32.

With the filter element 46 sealed in internal chamber 32, an upper surface of the bottom wall 56 in a central depression or open area of the filter element cooperates with the water entering inlet 18, through an opening in shoulder 28, to direct, deflect or turn the flow of water from the inlet in the direction of the arrows 60. That is, the water is turned by the upper surface of the bottom wall 56 into an annular passage 62 formed between an inner surface of the recessed annular housing portion 22 and an inner surface or wall 64 formed in the central depression or open area of annular body 58. The water is then deflected by curved inner walls 66 of the top surface 33 into a plurality of inlet openings 68 (see FIG. 3) formed in top surface 54 of the annular body 58. The openings 68 include a screen or wire mesh therein to hold a filter media 70 in annular body 58. This filter media is preferably a chlorine removing media, such as Chlorgon™, manufactured by Sprite Industries of Corona California, as described in U.S. Pat. No. 5,914,043, issued Jun. 22, 1999. Water passes through the filter media 70 and out a plurality of exit openings 72 formed in the lower wall 56 of the annular body 58 of filter element 46. The exit openings 72 also having a wire mesh or screen held therein to keep the filter media 70 within the annular body 58. After leaving the exit openings 72 the water is deflected by an inner surface of lower wall 36 and a plurality of dividing walls or structural members 74, held or formed on this inner surface. This brings or directs the water past the second magnet 44, back to the centerline of the shower filter 10, and out the outlet 16. The dividing walls 74 also provide further strength to the lower wall 36 and support the second magnet 44 in position, centrally, in the shower filter, against the lower wall 56 of the filter element 46.

It, therefore, can be seen, that when the top and bottom halves 20, 30 are assembled to form the unit 10, as by being screwed together, the filter element 46 is sealingly held within the internal chamber 32 formed therebetween. The filter element 46 cooperates with the recessed annular portion 22, the inner wall 64 of the annular body 58, and the curved inner walls 66 of top surface 33 of upper housing 20 to direct water flow through inlet openings 68 into filter media 70 held in the annular body 58. The filter element 46 also directs the flow of water past both sides of both magnets 26, 44, and may be easily changed by unscrewing the top and bottom halves 20, 30, removing the filter, and refilling the filter with new filter media, or replacing the entire filter. The filter media 70 held within the filter element 46 may be any desired filter media, but is preferably Chlorgon™, as described above, which removes chlorine and other unwanted materials from hot shower water. This filter media, together with the ultra-strong magnets 26, 44, provides increased filtering performance, while, at the same time, decreasing or preventing the build up of unwanted lime deposits or scales.

All of the elements of shower filter assembly of the present invention may be fabricated in any desired manner, using any acceptable material, such as by molding plastic materials to form the various elements of the filter assembly, and forming the ring magnets as described above. Each of the elements are sized and dimensioned so that it is of minimum size, but cooperate to provide optimum performance.

Accordingly, as will be apparent to those skilled in the art, the shower filter assembly of the present invention provides considerable advantages in ease and flexibility of manufacture, installation and use. Additionally, the shower filter assembly of the present invention takes up substantially less space than many known shower filters, and contains means for applying magnetic fields to water passing therethrough so as to maintain a cleaner shower area.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A compact shower filter assembly comprising, in combination:
    a hollow body having two mating parts to form an inner chamber therebetween;
    an inlet and an outlet connected to the inner chamber to allow the flow of water into and out of the inner chamber;
    a filter element including a water deflector portion formed therein mounted within the inner chamber;
    the filter element having an annular body which is secured in the inner chamber;
    a filter media substantially filling the annular body; and
    means for applying a magnetic field to water flowing into and out of the inner chamber.

2. The compact shower filter of claim 1, further including a plurality of inlet openings and a plurality of outlet openings in the annular body.

3. The compact shower filter of claim 2 wherein the inlet is recessed and includes screw threads therein, and an inner surface of the recessed inlet cooperates with an inner wall portion of the annular body to form an annular passage to direct water flowing into the inner chamber into the plurality of inlet openings.

4. The compact shower filter of claim 3 wherein the means for applying a magnetic field comprises at least one magnet held in the compact shower filter.

5. The compact shower filter of claim 4 wherein the means for applying a magnetic field comprises two ring magnets held in the compact shower filter.

6. The compact shower filter of claim 5 wherein the two ring magnets are mounted adjacent the inlet and outlet of the compact shower filter.

7. The compact shower filter of claim 4, further including curved inner walls formed in an upper of the two mating parts, adjacent the annular passage to aid in directing the flow of water.

8. The compact shower filter of claim 2 wherein the plurality of exit openings in the annular body cooperate with a plurality of dividing walls formed in a bottom wall of a lower of the two mating parts to direct the flow of water to the outlet.

9. The compact shower filter of claim 1 wherein the means for applying a magnetic field is a pair of magnets and the two mating parts of the hollow body include a top hollow mating half having curved inner walls at an upper portion thereof, and a bottom hollow mating half having the outlet at a lower end thereof; and the inlet is held in a recessed portion formed in an upper wall of the top hollow mating half with a first of the pair of magnets sealing captured in the recessed portion; the recessed portion extending into a central open area formed in the filter element.

10. The compact shower filter of claim 9, further including an annular passage formed between the filter element and the recessed inlet; and the annular passage cooperating with curved inner walls in the inner chamber to direct the flow of water into a plurality of inlet openings in an annular chamber of the filter element.

11. The compact shower filter of claim 10 wherein the filter element includes a plurality of exit openings in the annular chamber and a second of the pair of ring magnets is mounted adjacent the outlet, downstream of the filter element, in the inner chamber.

12. A compact shower filter comprising, in combination:
    a body comprised of a top hollow mating half having a recessed inlet and a bottom hollow mating half having an outlet;
    the top hollow mating half and the bottom hollow mating half being held together by matching threads formed at mating ends thereof and forming an internal chamber;
    a water filter assembly having an annular housing with a plurality of inlet openings and a plurality of exit openings and a filter media held within the annular housing; the water filter assembly being secured in the internal chamber between annular wall portions formed in the internal chamber;
    at least one magnet held in the body; and
    means in the internal chamber for directing flow of water from the recessed inlet past the at least one magnet through the water filter assembly and out the outlet.

13. The compact shower filter of claim 12 wherein the recessed inlet forms an annular portion recessed into a top wall of the top hollow mating half and there are two magnets held in the body.

14. The compact shower filter of claim 13 wherein the two magnets are ultra-strong ring magnets and the flow of water is directed from the inlet into the plurality of inlet openings via an annular passage formed by the annular portion and an inner wall of the annular housing.

15. A compact shower filter comprising, in combination:
    a substantially cylindrical body having a top hollow mating half with a recessed annular housing portion having an inlet, and a bottom hollow mating half having an outlet;
    the top hollow mating half and the bottom hollow mating half having annular end portions with threads formed thereon, which annular end portions are screwed together so as to form an internal chamber;

a filter assembly having an annular body with a bottom wall, an inner wall forming a deflector and a top wall held in the internal chamber, between annular wall portions;

the annular body having a plurality of inlet openings, a plurality of exit openings and filter media held therein;

a first ultra-strong ring magnet and a second ultra-strong ring magnet held in the substantially cylindrical body; and an inner wall formed in a central depression in the filter assembly, for directing flow of water from the recessed inlet through the plurality of inlet openings, through the filter media, out the plurality of exit openings and through the outlet.

16. The compact shower filter of claim 15 wherein the first ultra-strong ring magnet is held in the recessed annular housing portion, above the bottom wall of the filter assembly.

17. The compact shower filter of claim 16, further including an annular passage in the internal chamber, after the first ultra-strong ring magnet; and wherein the internal chamber includes curved inner walls at an upper end of the top hollow mating half to aid in directing the flow of water from the inlet into the annular chamber.

18. The compact shower filter of claim 17 wherein the annular passage is formed between the inner wall of the annular chamber, above the bottom wall, and an inner surface of the recessed annular housing portion.

19. The compact filter of claim 18 wherein the flow of water passes from the plurality of exit openings in the bottom wall, past the second ultra-strong ring magnet, which second ultra-strong ring magnet is supported by a plurality of dividing walls, and out the outlet.

20. The compact filter of claim 15 wherein the flow of water therethrough, from the recessed inlet into the outlet, passes through inside and outside portions of the first ultra-strong magnet and the second ultra-strong magnet so as to be exposed to eight polar fields.

* * * * *